Nov. 8, 1955

E. H. MUELLER 2,723,102

VALVE FOR CONTROLLING GAS

Filed Jan. 12, 1952

INVENTOR.
ERVIN H. MUELLER
BY
Barnes, Kisselle, Laughlin & Raisch
ATTORNEYS.

INVENTOR.
ERVIN H. MUELLER

2,723,102

VALVE FOR CONTROLLING GAS

Ervin H. Mueller, Grosse Pointe, Mich.

Application January 12, 1952, Serial No. 266,210

1 Claim. (Cl. 251—96)

This invention relates to a valve for controlling the flow of fuel gas to a burner and particularly to a top burner of a gas range.

The invention aims to provide an improved valve construction of the type which automatically locks itself in off position and which may be manipulated into a position for a small flow of gas for a low or simmer flame at the burner, and for a full flow of gas for a high or full flame at the burner. One of these positions is intermediate the extreme positions of adjustment and parts are constructed to give an audible indication of such intermediate position. A further object of the invention is to provide such a valve so constructed and arranged that a large number of parts and elements thereof are the same or substantially the same as an ordinary or plain type of valve which has no locking facility to the end that it may be manufactured expediently and at relatively low cost with the advantages thereof flowing to the buying public. A valve constructed in accordance with the present invention is shown in the accompanying drawings:

Figure 1:
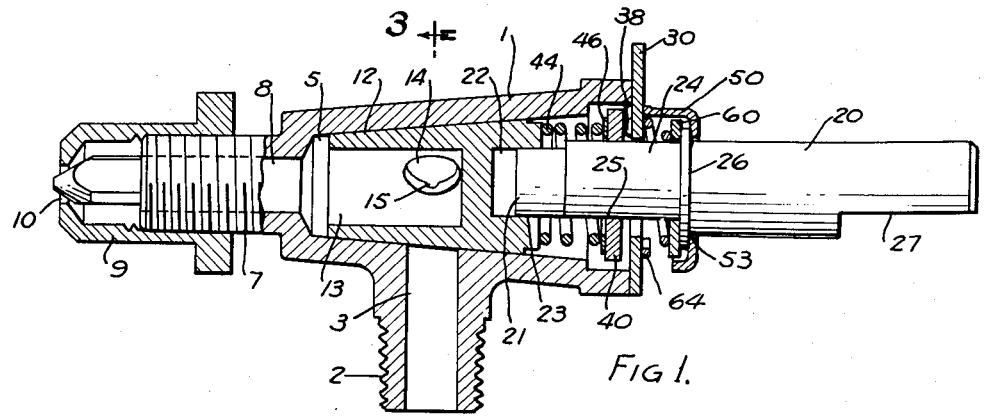
Fig. 1 is a view largely in cross section taken through the valve showing the valve in off position.

The valve, as illustrated in Fig. 1, has a body 1 with a threaded extension 2 provided with an inlet passage 3 which communicates with a tapered valve chamber 5 in the body. The body has a threaded extension 7 with an outlet passage 8 and the extension is arranged to receive the usual hood 9 having an outlet orifice 10 for projecting gas into the mixing tube of a burner.

Seated in the valve chamber is a valve member 12 having a passage 13 which opens through the end thereof. This valve member has a port 14 and a port in the form of a slot which may be termed a tail port as shown at 15.

Figure 3:
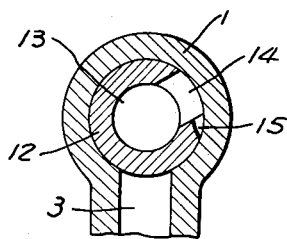
Fig. 3 is a cross sectional view taken substantially on line 3—3 of Fig. 1 showing the position of the ports in off position.
Figure 4:
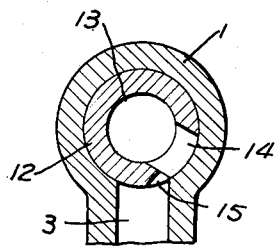
Fig. 4 is a view similar to Fig. 3 showing the ports in simmer position.

At this point it may be well to refer to the operation of the valve from the standpoint of the opening and closing of the ports. When the valve member 12 is positioned as shown in Fig. 3, the inlet passage 3 is closed. This is the off position. When the valve member is turned clockwise to the position shown in Fig. 4, the tail port 15 registers or partially registers with the inlet 3 and a small amount of gas may flow through port 15, through port 14, and into and through passage 13. This is the intermediate or simmer position. When the valve is turned further clockwise to the position shown in Fig. 5, the port 14 registers with the inlet 3 and this is the full on position. In the construction shown, the valve member is movable about 60° from the Figure 3 position to the Fig. 4 position and about 60° from the Fig. 4 position to the Fig. 5 position.

There is an operating stem 20 which has an ensmalled inner end 21 which slidably and non-rotatably engages in a recess 22 of the valve member. For this purpose, the portion 21 may have a flat side 23 for engaging a similar flat formation in the recess 22. This stem has an intermediate portion 24 with a flat side as shown at 25, a shoulder 26 and an outer end portion with a flat side 27 adapted to receive a suitable operating handle.

There is an inner cap 30 in the form of a plate secured to the body by screws 31 which pass through elongated apertures 32 therein, the plate having a central aperture 33 through which the stem extends. The plate extends outwardly from the body as shown in Fig. 1, and is provided with one or more slots 35 and on the plate, in a position to lie within the wall of the valve body, are projections 38 formed by pressing out the metal of the plate and these projections are advantageously of rounded form.

There is a washer 40 which lies within the inner cap 30 and it has a central aperture with a flattened side as shown at 41 so that it rotates with the stem. This washer has radially extending depressions or grooves 42. Disposed between the valve member 12 and the washer 40 is a coil spring 44 which normally seats the valve member in its chamber and holds the washer 40 against the inner cap 30. A friction or bearing washer 46 may be disposed between the end of the spring and the washer 40. The provision of four recesses or grooves 42 in the click washer, even though only two are used, provides a solid base for the washer 46, and also, since the washer 40 has four depressions therein, it may be used in other valves which require additional recesses.

An outer cap 50 is formed with aperture ears 51 for receiving the screws 31 and the central portion of the cap 50 has some depth as shown in Fig. 1 and it has an aperture 53 through which the stem passes. The wall of the deepened center portion of the cap is cut away to provide a shoulder 55 and a shoulder 56, and the cut away portion is defined by a flange portion 57 having a locking notch 58 therein.

There is a locking and limit washer 60 with a D-shaped aperture 61 therein mounted on the stem to turn therewith and this washer has a projecting tongue 62 which operates between the shoulders 55 and 56. Another coil spring advantageously of conical shape, and as illustrated at 64, is positioned within the outer cap and between the inner cap and the washer 60. This spring holds the shoulder 26 of the stem against the cap 50 and also urges the washer 60 against the shoulder 26.

Figure 5:
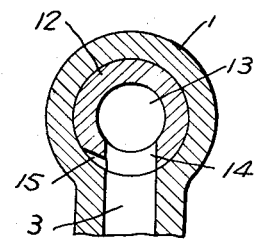
Fig. 5 is a view similar to Figs. 3 and 4 illustrating the position of the ports in full on position.
Figure 6:
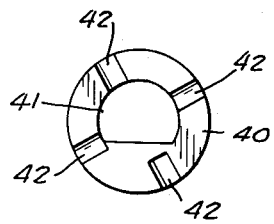
Fig. 6 is a view of a washer arranged to give an audible click.
Figure 7:
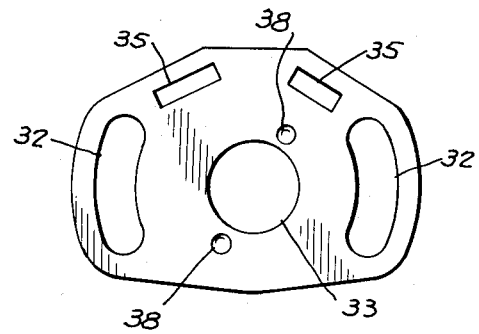
Fig. 7 is a view of an inner adjustable cap for cooperation with the clicking washer shown in Fig. 6.
Figure 8:
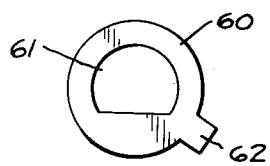
Fig. 8 is a view of a limit washer.
Figure 9:
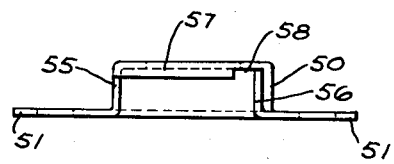
Fig. 9 is a view showing the outer cap.

In the normal off position of the valve with the ports positioned as shown in Fig. 3, the tongue 62 lies against the limit shoulder 56 of the cap. Because of the action of the spring 64, the tongue 62 is urged into the locking recess 58. Thus the valve is locked in off position. In order to manipulate the valve, the stem 20 is pushed inwardly. The part 21 of the stem slides into the recess 22 of the valve member, and through the means of the shoulder 26, the spring 64 is compressed and the washer 60 moved axially to release the tongue 62 from the recess 58. Then the valve may be turned, for example, to the position shown in Figs. 4 and 2a. During this time, and after the operator has released the axial pressure on the stem, the tongue 62 rides on the flange 57. When the valve is in full-on position, as shown in Figs. 5 and 2b, the tongue 62 engages the limit shoulder 55. When the valve is reversely operated from position 5, the tongue 62 rides along the flange 57 and when the valve is in off position, which position is determined when the tongue strikes the limit shoulder 56, the spring 64 snaps the tongue 62 into the locking recess 58.

Figure 2:
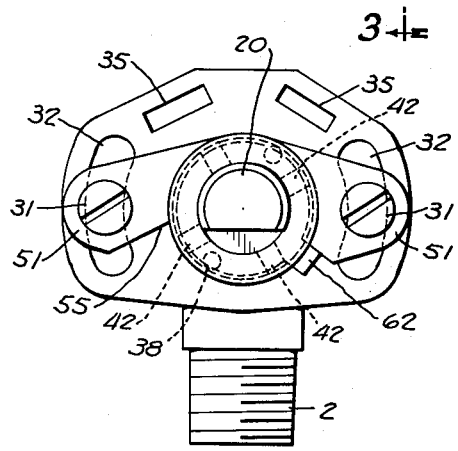
Fig. 2 is an end view of the valve illustrating the valve in off position and showing some of the parts in dotted lines.
Figure 2A:
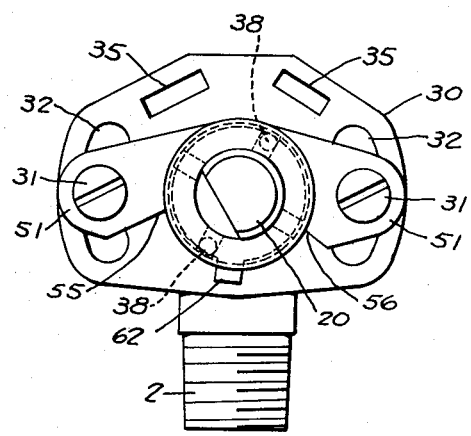
Fig. 2a is a view similar to Fig. 2 showing the parts in simmer position.
Figure 2B:
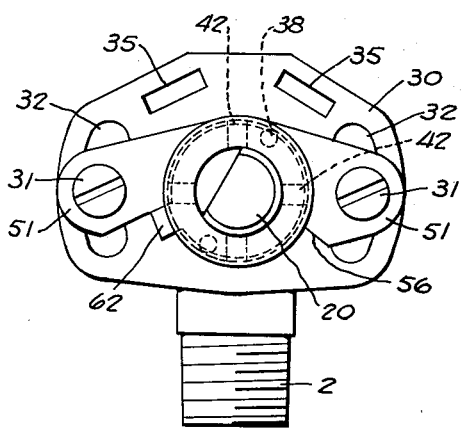
Fig. 2b is a figure similar to Fig. 2 showing the parts in full-on position.

As shown in Fig. 2, it will be noted that the recesses 42 are disaligned from the bumps or projections 38. Therefore, the click washer 40 is held spaced from the inner cap 30 as shown in Fig. 1 since it rides on the projections 38. When the valve is turned clockwise, two opposite recesses 42 move into positions of alignment with the projections (see Fig. 2a) and due to the action of the spring 44 the washer 40 is snapped against the inner cap thus producing an audible indication of the simmer position. The washer 40 is sufficiently loose on the stem so that it may freely be clicked or snapped into the position shown in Fig. 2a. Upon further clockwise movement of the valve to the full on position, as shown in Fig. 2b, the recesses 40 are again displaced from the projections 38. The simmer position is, of course, indicated as the valve is moved from the full on position toward the off position.

In order to make an adjustment for the simmer position, the inner cap 30 is rotatably adjusted. This is done by loosening the screws 31 and then by placing a suitable tool, such as a screw driver in one of the apertures 35, to rotatably adjust the inner cap. When the adjustment is properly made the screws 31 are tightened. In this way the position of the tail port 15 relative to the inlet passage 3 is given at the time of the audible indication given by the click washer.

I claim:

A valve for controlling the flow of gas comprising, a valve body, a valve member rotatably seated in the valve body, the valve body and valve member having ports positioned to be brought into and out of registry in different positions of the valve member relative to the valve body, an operating stem slidably and non-rotatably connected to the valve member, an inner cap in the form of a plate positioned against the valve body and having a portion extending beyond the valve body, an outer cap of recess form positioned against the outer face of the inner cap, said caps having apertures through which the stem extends, screws passing through apertures in the caps and securing them to the valve body and said apertures in the inner cap being elongated so that the inner cap may be rotatably adjusted, a click washer non-rotatably and slidably mounted on the stem and on the inside of the inner cap, a coil spring between the valve member and click washer and ineffective upon the stem, the click washer and inner cap having cooperating projections and recesses adapted to snap into engagement by the action of the spring to indicate a position of said ports, a shoulder on the stem positioned within the outer cap, a limit and lock washer non-rotatably mounted on the stem, a second coil spring around the stem reacting between the inner cap and the limit and lock washer for holding the limit and lock washer against said shoulder, and said shoulder against the inside of the outer cap, the outer cap having spaced limit shoulders and a locking recess, and a tongue on the limit and lock washer operable between the limit shoulders and engageable in the locking recess by the action of the second named spring and disengageable therefrom by axial movement from the stem.

References Cited in the file of this patent

UNITED STATES PATENTS

| | | |
|---|---|---|
| 1,982,101 | Herbster | Nov. 27, 1934 |
| 2,111,998 | Stuckenholt et al. | Mar. 22, 1938 |
| 2,243,128 | Rutherford | May 27, 1941 |
| 2,262,703 | Stuckenholt | Nov. 11, 1941 |
| 2,592,056 | Mueller | Apr. 8, 1952 |